US012764226B1

(12) United States Patent
Ketharaju et al.

(10) Patent No.: US 12,764,226 B1
(45) Date of Patent: Oct. 13, 2026

(54) FRAUDULENT CALL DETECTION IN A CONTACT CENTER

(71) Applicant: WELLS FARGO BANK, N.A., San Francisco, CA (US)

(72) Inventors: Rameshchandra B. Ketharaju, Hyderabad (IN); Anindya Sil, Kolkata (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 268 days.

(21) Appl. No.: 18/526,189

(22) Filed: Dec. 1, 2023

(51) Int. Cl.

| | |
|---|---|
| ***H04M 3/22*** | (2006.01) |
| ***G10L 15/00*** | (2013.01) |
| ***G10L 15/06*** | (2013.01) |
| ***G10L 15/18*** | (2013.01) |
| ***H04M 3/51*** | (2006.01) |

(52) U.S. Cl.
CPC ......... *H04M 3/2281* (2013.01); *G10L 15/005* (2013.01); *G10L 15/063* (2013.01); *G10L 15/1807* (2013.01); *H04M 3/51* (2013.01); *G10L 2015/0631* (2013.01)

(58) Field of Classification Search
None
See application file for complete search history.

(56) References Cited

U.S. PATENT DOCUMENTS

| | | | | |
|---|---|---|---|---|
| 7,327,837 | B1 * | 2/2008 | Harlow ............... | H04M 3/2281 379/221.09 |
| 10,244,113 | B2 | 3/2019 | Kao et al. | |
| 10,482,466 | B1 * | 11/2019 | Walters .................... | G06N 3/09 |
| 10,726,850 | B2 | 7/2020 | Mossoba et al. | |
| 11,050,876 | B2 | 6/2021 | Balasubramaniyan et al. | |
| 11,495,244 | B2 | 11/2022 | Looney et al. | |

(Continued)

FOREIGN PATENT DOCUMENTS

| | | |
|---|---|---|
| EP | 3873075 A1 | 9/2021 |

OTHER PUBLICATIONS

Aksman, Daniel , et al., "Fraud Detection: Using Artificial Intelligence to Identify Suspicious Persons Over the Phone", May 2020, 63 pages, Available online at: https://www.researchgate.net/publication/344644737_Fraud_Detection_Using_Artificial_Intelligence_to_Identify_Suspicious_Persons_Over_the_Phone.

*Primary Examiner* — Quynh H Nguyen
(74) *Attorney, Agent, or Firm* — Kilpatrick Townsend & Stockton LLP

(57) ABSTRACT

A call center computing system (CCCS) identifies a user profile associated with information identifying a user in a call received at a call center. The CCCS accesses an audio segment of the call and applies a fraud detection model to the audio segment to determine one or more scores predicting a likelihood the call is fraudulent. Applying the fraud detection model includes accessing a cultural tone profile defining a first combination of features determined from a baseline voice sample associated with the user profile and generating prosodic features defining a second combination of features associated with a voice recorded in the audio segment. Applying the fraud detection model also includes determining the one or more scores by evaluating the generated prosodic features based on the cultural tone profile. The CCCS categorizes the call in a particular category selected from a set of categories and performs an action with the call.

18 Claims, 7 Drawing Sheets

(56) References Cited

U.S. PATENT DOCUMENTS

| | | | | |
|---|---|---|---|---|
| 2015/0052084 | A1* | 2/2015 | Kolluru | G06T 13/40 706/11 |
| 2019/0037081 | A1* | 1/2019 | Rao | H04M 3/5175 |
| 2022/0147819 | A1* | 5/2022 | Lawrence | G06N 3/09 |
| 2024/0311474 | A1* | 9/2024 | Gaubitch | G10L 17/26 |

* cited by examiner

BI-DIRECTIONAL MATRIX 610

Cultural tone profile (1 -> n)

Dominant feature (1=hi, 3=low)

| | 1 | 2 | 3 | 4 | ... | n |
|---|---|---|---|---|---|---|
| Timbre (T) | 1 | 3 | 2 | | | |
| Loudness (L) | 3 | 2 | 1 | | | |
| Pitch (P) | 3 | 1 | 2 | | | |

CULTURAL TONE PROFILES 134

1 (620)

| | | | | |
|---|---|---|---|---|
| Timbre (T) | 60% | 70% | 80% | 90% |
| Pitch (P) | 30-10% | | | |
| Loudness (L) | 30-10% | | | |

2 (630)

| | | | | |
|---|---|---|---|---|
| Timbre (T) | 30-10% | | | |
| Pitch (P) | 30-10% | | | |
| Loudness (L) | 60% | 70% | 80% | 90% |

3 (640)

| | | | | |
|---|---|---|---|---|
| Timbre (T) | 30-10% | | | |
| Pitch (P) | 60% | 70% | 80% | 90% |
| Loudness (L) | 30-10% | | | |

*FIG. 6*

FRAUDULENT CALL DETECTION IN A CONTACT CENTER

TECHNICAL FIELD

This disclosure generally relates to detection of fraudulent calls. More specifically, but not by way of limitation, this disclosure relates to artificial intelligence (AI) based approaches for detection of fraudulent calls received at call centers.

BACKGROUND

Call centers can receive millions of calls annually and a significant proportion (e.g., one in 900) calls to call centers could be fraudulent. Activities resulting from such calls can result in losses and reputational damages for businesses. Conventional fraudulent call detection systems include multiple layers of rule-based queries and a manual review. However, fraudsters employ a wide variety of social engineering, intimidation and common knowledge-based authentication data for account takeover and conventional fraud detection systems may not identify calls as fraudulent when fraudsters use such techniques.

Further, the advancement of generative AI in the form of deepfake voices in the contact center increases the tools available to fraudsters for making fraudulent calls. Conventional AI-model-driven approaches to capture fraudulent calls exist but also have a high rate of false positives, which can have a significant adverse impact on long-term customer experience. Accordingly, a need exists to strike a balance between a seamless customer experience while also protecting sensitive data and assets.

SUMMARY

The present disclosure describes techniques for determining, by a call center computing system (CCCS), that a call is fraudulent using a fraud detection model. For example, the CCCS identifies a user profile associated with information identifying a user in a call received at a call center. The CCCS accesses audio data comprising an audio segment of the call received at the call center and applies a fraud detection model to the audio data to determine one or more scores predicting a likelihood that the call is fraudulent. Applying the fraud detection model to the audio data includes accessing a cultural tone profile associated with the user profile, the cultural tone profile defining a first combination of features determined from a baseline voice sample associated with the user profile. Applying the fraud detection model also includes generating prosodic features defining a second combination of features associated with a voice recorded in the audio segment of the call. Applying the fraud detection model also includes determining the one or more scores by evaluating the generated prosodic features based on the cultural tone profile. The CCCS categorizes, based on the one or more scores the call in a particular category selected from a predefined set of categories and, based on the selected category for the call, performs an action with regard to the call.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 6 depicts examples of cultural tone profiles, according to certain embodiments disclosed herein.

DETAILED DESCRIPTION

Figure 1:
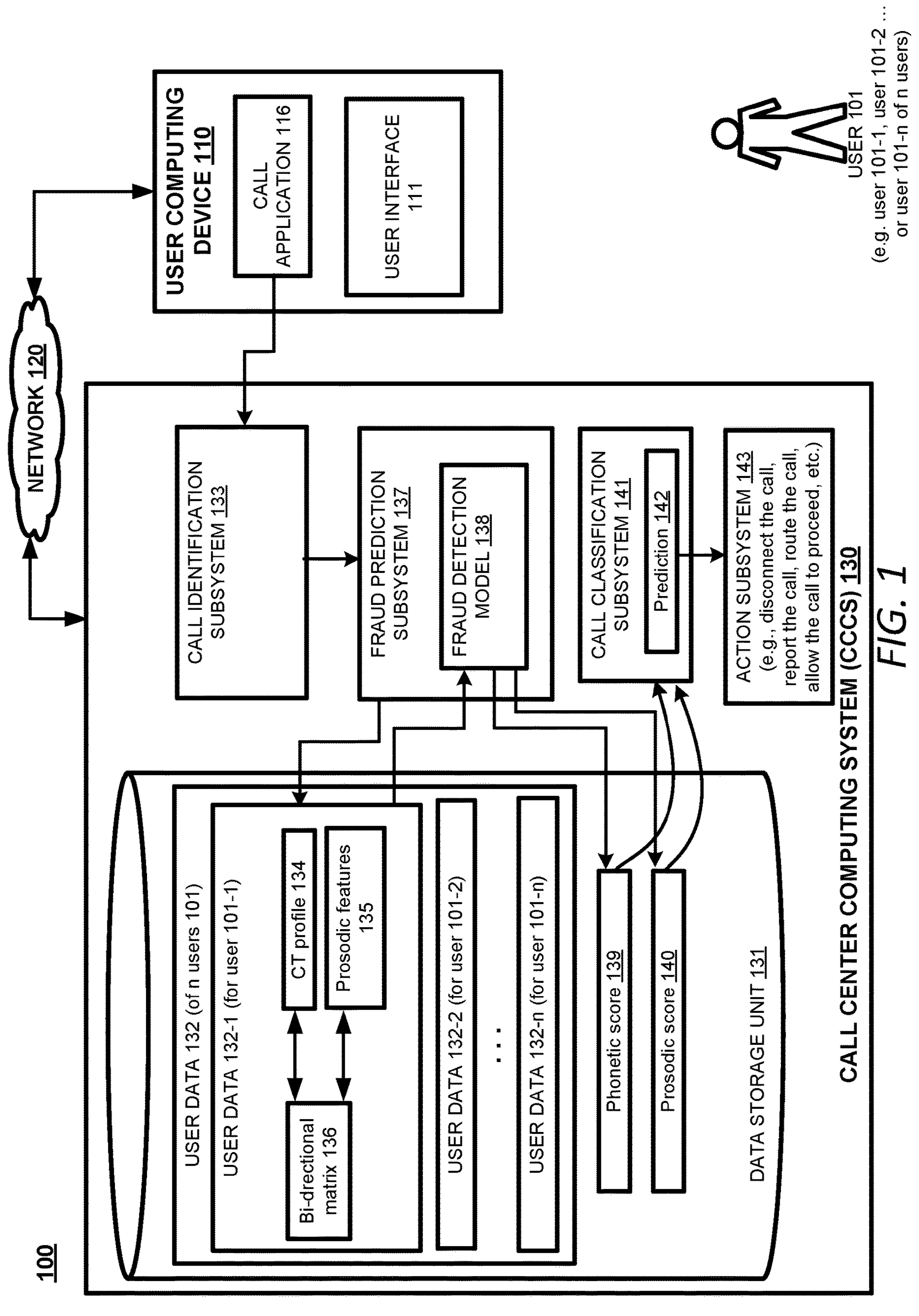
FIG. 1 depicts an example of a computing environment for determining whether a call received at a call center is fraudulent using a fraud detection model and performing an action with respect to the call based on the determination, according to certain embodiments disclosed herein.

In the following description, for the purposes of explanation, specific details are set forth in order to provide a thorough understanding of certain embodiments. However, it will be apparent that various embodiments may be practiced without these specific details. The figures and description are not intended to be restrictive. The words "exemplary" or "example" are used herein to mean "serving as an example, instance, or illustration." Any embodiment or design described herein as "exemplary" or "example" is not necessarily to be construed as preferred or advantageous over other embodiments or designs.

Certain embodiments described herein address the limitations of conventional systems by providing a call center computing system to determine whether a call is fraudulent using a fraud detection model and performing an action with respect to the call based on the determination. Certain embodiments described herein improve the fraud prediction capabilities of conventional fraud detection systems by, for example, clustering audio samples of users into a set of cultural tone profiles and comparing call audio against the cultural tone profile associated with the user. Further, the methods and systems described herein reduces a number of false positives compared to conventional fraud detection systems by using an iterative scoring process which refines a prediction during an ongoing call.

The following non-limiting example is provided to introduce certain embodiments. In certain embodiments, a call center computing system identifies a user profile associated with a call. For example, the call center computing system identifies an incoming call and accesses a user profile associated with the incoming call. For example, the call center computing system determines a telephone number, internet protocol ("IP") address, or other identifier associated with the incoming call and accesses a user profile associated with the identifier. For example, the call center computing system accesses a user profile associated with the telephone number of the incoming call. In some instances, the call is a telephone call from a home phone or mobile phone. In some instances, the call is made via a network using a voice and messaging application. The user profile data includes a cultural tone profile defining one or more voice features. In some instances, the call center computing system uses a clustering algorithm to cluster audio samples of a set of users into a set of clusters, where each cluster is a cultural profile tone. In some instances, factors such as cultural background, mother tongue, surrounding weather conditions, and usage of slang have a strong influence on the cultural profile tone.

The call center computing system applies a fraud detection model to audio extracted from the call and to data associated with the user profile to generate one or more scores. Applying the fraud detection model can include determining prosodic features from an audio segment of the call. For example, the prosodic features can include a unique vibratory musical resonance (ahata nada) of the audio representing a combination of pitch, timbre and loudness of the voice. For example, the ahata nada can be captured using fundamental, formant and sound pressure level analysis of the vowel phonemes used in the speech. Applying the fraud detection model can include using a bi-directional matrix to generate one or more scores evaluating the prosodic features based on the cultural tone profile. The bi-directional matrix is a matrix of cultural tone profile and the prosodic features and captures the influence of the cultural tone profile on the prosodic features or other characteristics of the user's voice. Using the bi-directional matrix of the fraud detection model can measure and maintain an influence factor for each of the dominant prosodic features across the cultural tone profile clusters. The bi-directional matrix assesses the prosodic features based on the cultural tone profile and assigns one or more score ranges that can be compared with one or more corresponding business rules to determine if each assigned score range complies with its corresponding business rule. For example, a score range assesses to what extent a score output by the model is acceptable for a caller to be considered genuine. Business rules, in some instances, are set based on resource capacities such as a number of fraud analysts available to manually evaluate suspected fraudulent calls, a dollar amount that the call center computing system targets to save, or other resource capacities. In some instances, based on the comparison of the determined score ranges with the corresponding business rules, the call center computing system determines that more audio data is necessary to classify the call as either fraudulent or not fraudulent. In these instances, the call center computing system generates multiple challenge questions for the caller designed to receive audio data including sounds of vowel phonemes. In these instances, the bi-directional matrix determines updated score ranges and compares the updated score ranges against the corresponding business rules. Subsequent audio data can be requested and obtained using subsequent challenge questions until all of the updated score ranges comply with their corresponding business rules. The fraud detection model can generate a phonetic score measuring a degree of originality of the caller's voice given the influence of cultural tone profile on the ahata nada of the caller's voice. In some instances, as the phonetic score increases, a confidence that the voice has been generated by using deepfake technologies increases and, as the phonetic score decreases, a confidence that the voice of the caller corresponds to the voice associated with the user profile increases. The fraud detection model can generate a prosodic score measuring a degree of certainty/truthfulness of the caller's voice while responding to questions asked by an agent in the call. In some instances, as the prosodic score increases, a confidence that a statement given by the caller is false increases and, as the prosodic score decreases, a confidence that the statement given by the caller is truthful increases. In some instances, the fraud detection model generates a combined score based on the phonetic score and the prosodic score.

The call center computing system categorizes, based on the generated one or more scores, the call either as either fraudulent or not fraudulent. For example, the call center computing system determines that the call is fraudulent if the combined score is greater than or equal to a threshold combined score and that the call is not fraudulent if the combined score is less than the threshold combined score. In some instances, the call center computing system determines that the call is fraudulent if one or both of the prosodic score or the phonetic score is greater than or equal to a corresponding prosodic score threshold or phonetic score threshold and that the call is not fraudulent if one or both of the prosodic score or the phonetic score is less than the corresponding prosodic score threshold or phonetic score threshold.

The call center computing system performs, based on the determined category for the call, one or more actions with respect to the call. For example, the call center computing system, in some instances, disconnects the call if the call is determined to be fraudulent. In some instances, the call center computing system routes the call to a specific agent to continue the call if the call is determined to be fraudulent. For example, the call center computing system may route the call to an experienced agent who can participate in the call to investigate and confirm whether the call is fraudulent. In some instances, the call center computing system reports information associated with the call to another system if the call is determined to be fraudulent. In some instances, the call center computing system allows the call to continue if the call is determined to not be fraudulent.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the following section, and further description is provided there.

Example Operating Environment for Determining Whether a Call Received at a Call Center is Fraudulent Using a Fraud Detection Model and Performing an Action with Respect to the Call Based on the Determination Referring now to the drawings, FIG. 1 depicts an example of a computing environment for determining whether a call received at a call center is fraudulent using a fraud detection model and performing an action with respect to the call based on the determination, according to certain embodiments disclosed herein.

The computing environment 100 includes a call center computing system (CCCS) 130 that can communicate via a network 120 with one or more user computing devices 110. For example, the user computing device 110 is a device with which a user makes a call to the CCCS 130.

In certain embodiments, the user device includes a user interface 111 and a call application 116. For example, the user can use the call application 116 to make a telephone call from the user computing device 110. For example, the user computing device 110 is a smartphone, a landline telephone, or other device capable of making a call. In some embodiments call application 116 comprises a web browser application or a third party application. For example, the web browser application or a third party application could include a messaging application that has voice call and/or voice with video call capabilities.

The user interface 111 enables a user to interact with the user computing device 110. The user, in some instances, has an account with the CCCS 130 and makes a call to the CCCS 130. For example, the CCCS 130 is associated with a banking system and the user has an account with the banking system and makes a call to the CCCS 130 to request information about the user's account to the banking system. However, in some instances, the user using the user computing device 110 makes a fraudulent call to attempt to access another user's account. The user interface 111 may be a touch screen interface, a voice-based interface, or any other interface that allows users to provide input and receive output from one or more applications on the user computing device 110. A user of the user computing device 110 may interact with the call application 116 via the user interface 111.

The call application 116 is a program, function, routine, or similar entity that exists on and performs its operations on the user computing device 110. The call application 116 can, responsive to inputs via the user interface 111 establish a call (e.g., a telephone call) with the CCCS 130. For example, the user inputs a telephone number associated with the CCCS 130 to the user interface and requests to initiate a call. The call application 116 communicates with the CCCS 130 via a telephone network or other network 120 that is able to facilitate a voice call and/or a voice call with video.

The call center computing system (CCCS) 130 can communicate with one or more user computing devices 110 via the network 120. In certain embodiments, the CCCS 130 includes a data storage unit 131, call identification subsystem 133, a fraud prediction subsystem 137, a call classification subsystem 141, and an action subsystem 143.

The data storage unit 131 may comprise a local or remote storage device or other memory suitable for storing information and accessible to the CCCS 130 . . . . The CCCS 130 can store, in the data storage unit 131, user data 132 of a set of n users 101 having accounts with the CCCS 130. For each of the users 101 (e.g., users 101-1, 101-2, . . . **101-*n*), the CCCS 130 can store, in the data storage unit 131, respective user data 132 (e.g., user data 132-1, 132-2, . . . 132-*n*). In some instances, each respective user data 132 can include a respective cultural tone (CT) profile 134, respective prosodic features 135 and a respective bi-directional matrix 136. Further details for clustering a set of users into cultural tone profiles 134 and assigning a user to a cultural tone profile 134 are described in FIG. 5. Further information describing generating prosodic features 135 and a bi-directional matrix 136 are described in FIG. 2, FIG. 3, and FIG. 4. In some instances, each user data 132 (e.g. user data 132-1, 132-2, . . . 132-*n* of n users) is associated with a user identifier. For example, the user identifier can be a customer name, a device identifier, an account number, or other identifier associated with the user. In some instances, the user identifier is determined based on information provided vocally by the user during the call. In some instances, the user identifier comprises a telephone number or device number associated with the user computing device 110 and detected by the CCCS 130** during the call.

In certain embodiments, call identification subsystem 133 accesses an incoming call from a user computing device 110, identifies a user profile associated with the call, and accesses user data 132 associated with the user profile. In some instances, the call identification subsystem 133 determines identifying information associated with the call and determines a user profile associated with the identifying information. For example, the identifying information comprises a telephone number, an IP address, or device identifier of the user computing device 110 or network 120 device to which the user computing device 110 is connected. In some instances, the identifying information is a user's name or account number and the call identification 133 determines the identifying information based on voice input of the user during the call or user interface 111 input of the user during the call (e.g., the user manually enters an account number using a keypad).

The fraud prediction subsystem 137 accesses user data 132 associated with a user profile associated with identification information determined for the call. The user data 132 comprises a cultural tone (CT) profile 134, prosodic features 135 and a bi-directional matrix 136. Further details for clustering a set of users into cultural tone profiles 134 and assigning a user to a cultural tone profile 134 are described in FIG. 5. Further information describing generating prosodic features 135 and a bi-directional matrix 136 are described in FIG. 2, FIG. 3, and FIG. 4. The fraud prediction subsystem 138 comprises a fraud detection model 138. The fraud prediction subsystem 137 applies the fraud detection model 138 to data from the user data 132 and to audio extracted from the incoming call to generate a phonetic score 139 and a prosodic score 140 for the call. In some instances, the fraud prediction subsystem 137 generates a combined score based on the phonetic score 139 and the prosodic score 140. Further details describing the components of the fraud detection model 138 and details describing applying the fraud detection model 138 to generate one or more scores for the call are described in FIG. 2, FIG. 3, and FIG. 4.

In certain embodiments, the call classification subsystem 141 determines, based on one or more of the phonetic score 139, the prosodic score 140, or a combined score determined based on the phonetic score 139 and the prosodic score 140, a prediction 142 associated with the call. For example, the prediction 142 can comprise a classification of the call into a fraudulent category or a non fraudulent category. Further details concerning generating the prediction 142 are described in FIG. 2 and FIG. 3. In some instances, the prediction 142 is a classification of the call into a fraudulent category, a non fraudulent category, or an undetermined category. In these instances, the call classification subsystem 141 can instruct the fraud prediction subsystem 137 to extract further voice data from the call to use to generate an updated phonetic score 139 and updated prosodic score 140 by applying the fraud detection model 138 to the additional voice data as additional input. In these instances, the call classification subsystem 141 can determine an updated prediction 142. Further details concerning determining a prediction 142 and determining an updated prediction 142 in instances when the call cannot be classified as either non fraudulent or fraudulent are described in FIG. 4. In some embodiments, the prediction 142 comprises a probability that the call is fraudulent.

The action subsystem 143 performs an action with regard to the call based on the prediction 142 determined by the call classification subsystem 141. For example, the action subsystem 143, in some instances, disconnects the call if the prediction 142 is the fraudulent category. In some instances, the action subsystem 143 routes the call to a specific agent to continue the call if the prediction 142 is the fraudulent category. For example, the call center computing system may route the call to an experienced agent who can participate in the call to investigate and confirm whether the call is fraudulent. In some instances, the action subsystem 142 reports information associated with the call to another system if the prediction 142 is the fraudulent category. In some instances, the action subsystem 142 allows the call to continue if the prediction 142 is the non-fraudulent category.

The CCCS 130 (including the call identification subsystem 133, the fraud prediction subsystem 137, the call classification subsystem 141, and the action subsystem 143) may be implemented using software (e.g., code, instructions, program) executed by one or more processing units (e.g., processors, cores), hardware, or combinations thereof. The software may be stored on a non-transitory storage medium (e.g., on a memory device). The computing environment 100 depicted in FIG. 1 is merely an example and is not intended to unduly limit the scope of claimed embodiments. One of the ordinary skill in the art would recognize many possible variations, alternatives, and modifications. For example, in some implementations, the CCCS 130 can be implemented using more or fewer systems or subsystems than those shown in FIG. 1, may combine two or more subsystems, or may have a different configuration or arrangement of the systems or subsystems.

Figure 2:
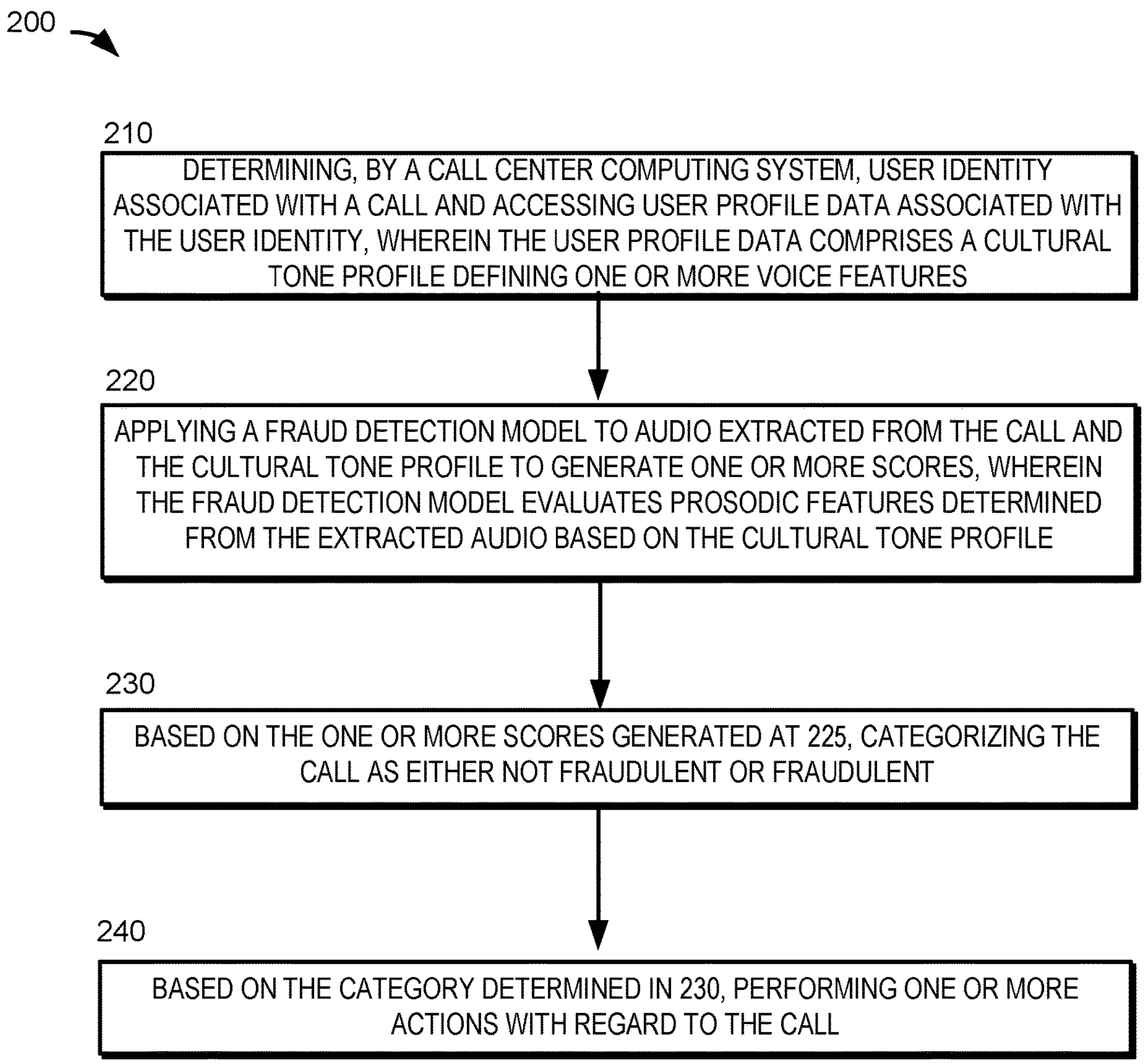
FIG. 2 depicts an example of a process for determining whether a call received at a call center is fraudulent using a fraud detection model and performing an action with respect to the call based on the determination, according to certain embodiments disclosed herein.

Examples of Computer-Implemented Operations for Determining Whether a Call Received at a Call Center is Fraudulent Using a Fraud Detection Model and Performing an Action with Respect to the Call Based on the Determination FIG. 2 depicts an example of a process for determining whether a call received at a call center is fraudulent using a fraud detection model 138 and performing an action with respect to the call based on the determination, according to certain embodiments disclosed herein. One or more computing devices (e.g., CCCS 130 or the individual subsystems contained therein) implement operations depicted in FIG. 2. For illustrative purposes, the process 200 is described with reference to certain examples depicted in the figures. Other implementations, however, are possible.

In certain examples, the CCCS 130 can facilitate screening of incoming calls received at a call center for potential fraudulent activity. In some embodiments, the CCCS 130 is associated with the call center. In some embodiments, the CCCS 130 is a third party computing system that provides a service for detecting fraudulent calls received at the call center system.

At block 210, the method 200 involves determining, by a call center computing system (CCCS) 130, a user identity associated with a call and accessing user profile data 132 associated with the user identity, wherein the user profile data 132 comprises a cultural tone profile 134 defining one or more voice features. In some instances, the CCCS 130 uses a clustering algorithm to cluster audio samples of a set of users into a set of clusters, where each cluster is a cultural profile tone. For example, each user profile is mapped in a multidimensional space, where each dimension represents a specific feature of a set of voice features. For example, the cultural tone profile 134 may comprise an average of each of one or more voice features of a cluster. Each of the set of users is assigned to a cultural tone profile 134 that is most similar to voice features detected in the user's audio sample. In some instances, factors such as cultural background, mother tongue, surrounding weather conditions, and usage of slang have a strong influence on the cultural tone profile 134. Further details describing generation of a set of cultural tone profiles 134 and association of a cultural tone profile 134 with a user are described in FIG. 5.

At block 220, the method 200 involves applying, by the CCCS 130, a fraud detection model 138 to audio extracted from the call and to the cultural tone profile 134 to generate one or more scores, wherein the fraud detection model 138 evaluates prosodic features 135 determined from the extracted audio based on the cultural tone profile 134. Further details describing the fraud detection model 138 and applying the fraud detection model 138 to audio of an incoming call and a cultural tone profile 134 to generate one or more scores are provided in FIG. 3 and FIG. 4. In certain embodiments, the one or more scores comprise one or more of a phonetic score 139, a prosodic score 140, or a combined score determined based on the phonetic score 139 and the prosodic score 140. In some instances, the combined score is a weighted score including configurable weights associated with each of the phonetic score 139 and the prosodic score 140.

The phonetic score 139 (e.g., nada score) captures the unique combination of timbre, pitch and loudness in the vowel sounds in the speech of the user conducting the call. For example, the timbre describes a quality or character (e.g., a color) of the sound, the pitch describes a frequency of the sound, and the loudness describes an intensity of the sound.

Timbre enables differentiation between voices of different users and captures factures such as harmonics and overtones present in the sound that vary from user to user. A user's timbre can depend on a size or shape of the user's vocal tract, position of the vocal cords, and the way air flows through the respiratory system. Additionally, an emotional state, a physical condition, and/or a cultural background of the user can affect the user's timbre. In some instances, timbre can be determined based one or more of a spectral analysis or a formant analysis of the user's audio sample. For example, spectral analysis identifies the relative strength and distribution of the overtones by examining a frequency spectrum of the voice signal using a Fourier analysis. Formant analysis identifies resonances in the user's vocal tract and can help identify the vowel sounds and overall shape of the vocal tract during speech production. Pitch can be determined using one or more of a fundamental frequency (F0) analysis, electroglottography (EGG), or Laryngoscopy. F0 analysis involves extracting a lowest frequency of the voice signal and then estimating a fundamental frequency (F0) using an autocorrelation process, cepstral analysis or a Fourier transform. EGG measures an electrical impedance of the vocal fold during phonation which can help reveal vibratory pattern with the F0. Laryngoscopy involves using a specialized clinical device to visualize vocal folds. Loudness can be measured using sound pressure level (SPL) analysis. SPL analysis involves measuring the intensity of voice signal in terms of acoustic energy. Distance between the source and microphone device, ambient noise levels and recording equipment can affect the SPL analysis measurement.

At block 230, the method 200 involves categorizing, by the CCCS 130 based on the one or more score generated at block 220, the call as either not fraudulent or fraudulent. For example, the CCCS 130 generates a prediction 142 of a category to which to assign the call. For example, the CCCS 130 determines that the call is fraudulent if the combined score (e.g., a weighted average of the phonetic score 139 and the prosodic score 140) is greater than or equal to a threshold combined score and that the call is not fraudulent if the combined score is less than the threshold combined score. In some instances, the CCCS 130 determines that the call is fraudulent if one or both of the prosodic score 140 or the phonetic score 139 is greater than or equal to a corresponding prosodic score 140 threshold or phonetic score 139 threshold, respectively, and that the call is not fraudulent if one or both of the prosodic score 140 or the phonetic score 139 is less than the corresponding prosodic score threshold or phonetic score threshold, respectively. Further details about categorizing the call are described in FIG. 3 and FIG. 4. In some instances, the prediction 142 is a classification of the call into a fraudulent category, a non fraudulent category, or an undetermined category. In these instances, the CCCS 130 can extract further voice data from the call to use to generate an updated phonetic score 139 and updated prosodic score 140 by applying the fraud detection model 138 to the additional voice data as additional input. In these instances, the CCCS 130 can determine an updated prediction 142 of a category for the call. Further details concerning determining a prediction 142 and then determining an updated prediction 142 in instances when the CCCS 130 is unable to classify the call as either non fraudulent or fraudulent are described in FIG. 4.

At block 240, the method 200 involves performing, by the CCCS 130 based on the category for the call determined in block 230, one or more actions with regard to the call. In some instances, the actions include disconnecting the call and the CCCS 130 disconnects the call if the call responsive to assigning the call to the category of "fraudulent." In some instances, the actions include routing the call to a specific agent to continue the call and the CCCS 130 routes the call responsive to assigning the call to the category of "fraudulent." For example, the CCCS 130 may route the call to an experienced agent who can participate in the call to investigate and confirm whether the call is fraudulent. In some instances, the actions include reporting information associated with the call to another system and the CCCS 130 report the call to the other system responsive to assigning the call to the category of "fraudulent." In some instances, the actions include allowing the call to continue and the CCCS 130 allows the call to continue responsive to assigning the call to the category of "not fraudulent."

Figure 3:
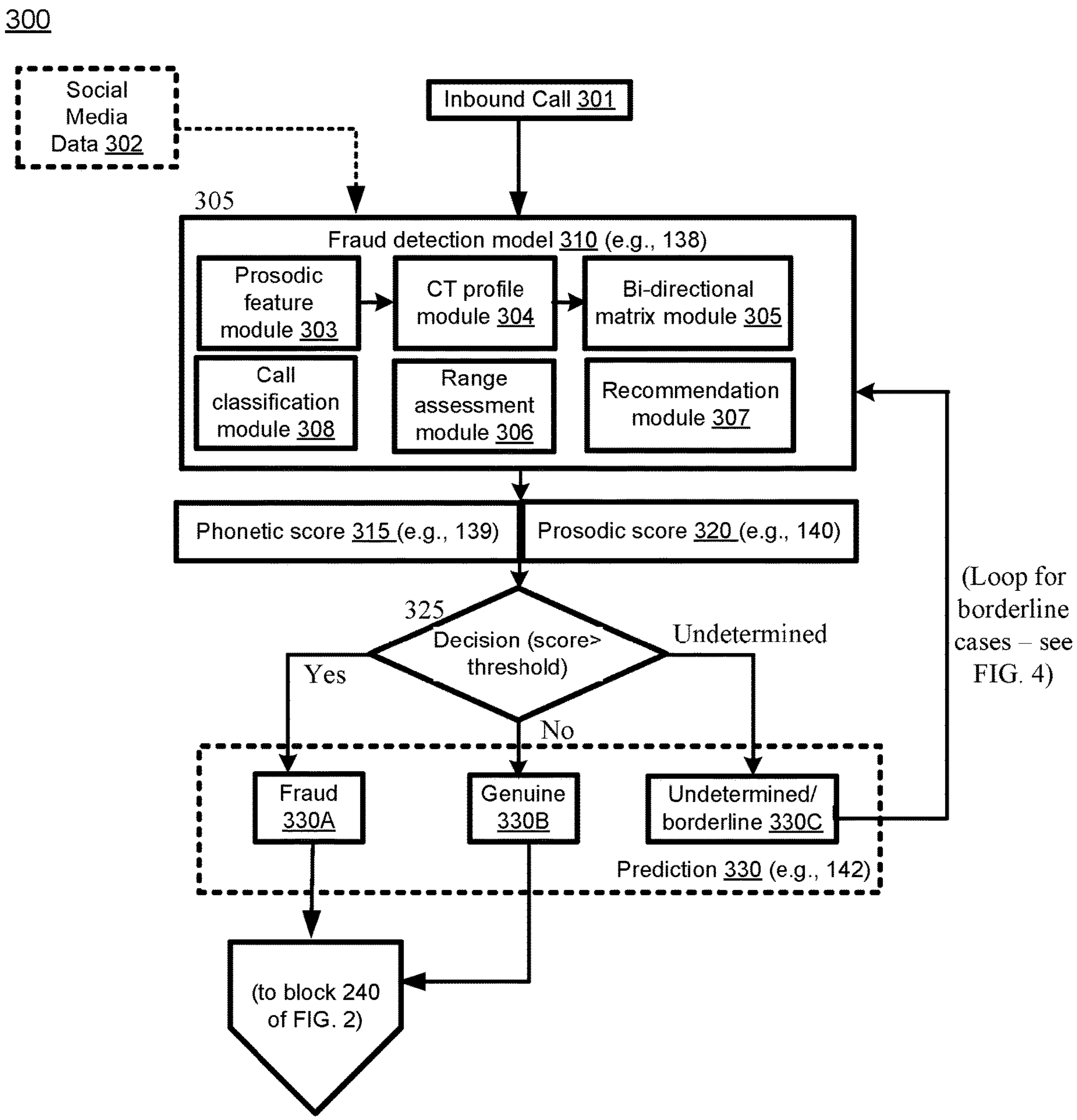
FIG. 3 depicts a fraud detection model and a process for scoring a call using the fraud detection model and classifying the call based on the scoring, according to certain embodiments disclosed herein.

FIG. 3 depicts a fraud detection model 138 and a process 300 for scoring a call using the fraud detection model 138 and classifying the call based on the scoring, according to certain embodiments disclosed herein. One or more computing devices implement operations depicted in FIG. 3. For illustrative purposes, the process 300 is described with reference to certain examples depicted in the figures. Other implementations, however, are possible.

At block 305, the method 300 involves inputting, by the CCCS 130 an inbound call 301 to a fraud detection model 310 (e.g., the fraud detection model 138). In some instances, as depicted in FIG. 3, the CCCS 130 also inputs, at block 305, social media data 302 associated with the user profile to the fraud detection model 310. As depicted in FIG. 3, applying the fraud detection model 310 to the inbound call 301 generates a phonetic score 315 (e.g., phonetic score 139) and a prosodic score 320 (e.g., prosodic score 140) for the call.

As depicted in FIG. 3, the example fraud detection model 310 comprises six modules including a prosodic feature module 303, a cultural tone (CT) profile module 304, a bi-directional matrix module 305, a call classification module 306, a range assessment module 307, and a recommendation module 308.

In certain embodiments, the prosodic feature module 303 determines prosodic features 135 from an audio segment of the call. For example, the prosodic features 135 can include a unique vibratory musical resonance (ahata nada) of the audio representing a combination of pitch, timbre and loudness of the voice. For example, the ahata nada can be captured using fundamental, formant and sound pressure level analysis of the vowel phonemes used in the speech.

In certain embodiments, the CT profile module 304 accesses a CT profile 134 associated with a user profile determined for the call. In the CT profile 134, factors including cultural background, mother tongue, surrounding weather conditions, and/or use of slang have a strong influence on the expected prosodic features 140 that would be identified for the user as the user is speaking during a voice call. In some instances, prerecorded (e.g. prior to the call) voice data and/or an on-boarding voice profiling can be leveraged to create clusters of cultural tones for a set of users and assign each of the set of users (including the user expected to be conducting the inbound call 301) to a CT profile 134 associated with a respective cultural tone cluster. For example, each user of the set of users belongs to at least one of a set of k CT profile 134 clusters, where $CT1 \cup CT2 \ldots \cup CTk=\{1, \ldots, n\}$. In this example, no user of the set of users belongs to more than one CT profile 134 cluster, where $CTi \cap CTj=\emptyset$ for all $i \neq j$.

In certain embodiments, the bi-directional matrix module 304 generates a bi-directional matrix 136 comprising a matrix of the CT Profile 134 and the prosodic features 135 to capture the influence of cultural tone on the prosodic features 135 or on other characteristics of the caller's voice. In some embodiments, the CCCS 130 develops the bi-directional matrix 134 for the user during a training phase with an initial audio sample received from the user and continues to update the bi-directional matrix 136 based on the new data coming from new calls and audio samples collected from social media data 302. For each of the dominant prosodic features 135, the bi-directional matrix module 304 measures and maintains an influence factor across CT profile clusters.

In certain embodiments, the range assessment module 306 assesses the prosodic features 135 based on the CT profile 134 and assigns a score range and compares the score range to business rules. As the prosodic features 135 can vary based on different factors like language, location, mother tongue, slang, weather at caller's location, the business rules define an acceptable range instead of a fixed score given by a classification model.

In certain embodiments, the recommendation module 307 comprises a large language model ("LLM") based recommendation system that aids in arriving at a confirmatory state of the output (e.g. scores 315 and 320) of the fraud detection model 138 especially for initial borderline cases. In certain embodiments, the recommendation module 307 generates one or more challenge questions for the user making the inbound call 301 and retrieves subsequent audio data from the inbound call 301 comprising the user's vocal response to the one or more challenge questions. In certain embodiments, the recommendation module 307 continues to generate subsequent challenge questions and receive subsequent audio data from the inbound call 301 until the range assessment module 306 determines a score range that complies with the business rules. For example, the recommendation module 307 may continue to generate challenge questions and access subsequent audio data from the inbound call 301 until it reaches the maximum number of iterations preset by the business rules or the score range is above a threshold distance from a borderline score range. In some instances, the recommendation module 307 generates challenge questions to increase the available audio data that includes particular vowel phonemes to aid the call classification module 308 to reach a conclusion faster.

In certain embodiments, the call classification module 308 generates one or more scores. The one or more scores can include a phonetic score 315 (e.g., phonetic score 139). The phonetic score 315 measures a degree of originality of the voice audio from the inbound call 301 based on the influence of CT profile 134 on the prosodic features 135 of the caller's voice. Pr ($Y_{df}$=Yes|CT=$CT_i$, X) for i={1, . . . k}, where, $Y_{df}$ represents the voice being original and not deepfake, CT represents the cultural tone profile 134, and X represents the prosodic features 135 extracted from the caller's voice. The phonetic score 315 represents a probability of the voice audio extracted from the inbound call 301 being produced by deepfake and not original given the caller's cultural profile tone 134 and prosodic features 135 extracted from the voice. The greater the phonetic score 315, the greater the confidence of the fraud detection model 310 that the user (e.g., the source of the voice audio data) is highly likely using deepfake technologies to generate his voice and that the voice is not the user's original voice. The one or more scores can include a prosodic score 320 (e.g., prosodic score 140). The prosodic score 320 quantifies a degree, power, or other measure of certainty or truthfulness in the voice of the user speaking during the inbound call 301 while answering questions posed by a live agent of the call center. A higher prosodic score 320 indicates a higher confidence to the live call agent that a statement is false based on the prosodic 135 features analyzed by the fraud detection model 310 and a lower prosodic score 320 indicates a lower confidence to the live call agent that the statement is false based on the prosodic 135 features analyzed by the fraud detection model 310. The calculation of the prosodic score 320 can be represented as Pr ($Y_{nt}$=Yes|CT=$CT_i$, X) for i={1, . . . k}, where, $Y_{nt}$ represents that the statement made by the caller is not true, CT represents the cultural tone profile 134, and X represents the prosodic features 135 extracted from the caller's voice during the inbound call 301. The prosodic score 320 represents a probability of the statement being not true given the caller's cultural profile tone 134 and prosodic features 135 extracted from the caller's voice when answering questions from a live call agent during the inbound call 301.

In some embodiments, the call classification module 308 generates a combined score based on the phonetic score 315 and the prosodic score 320. For example, the combined score may be a linear combination of a weighted average of the scores 315 and 320. Further, given a configurable combined score threshold the call classification module 308 can assign a label to the call, for example a fraudulent label or a genuine label. For example, generating the combined score can be represented as $Y_{fraud\_score}=w_i \times S_{phonetic}+w_j \times S_{prosodic}$, where $w_i$ and $w_j$ represent customizable weights for the respective scores, $S_{phonetic}$ represents the score produced above for deepfake voice (phonetic score 315), and $S_{prosodic}$ represents the score showing the degree of uncertainty or untruthfulness (prosodic score 320).

At block 325, the method 300 involves comparing the phonetic score 315 and the prosodic score 320 against respective threshold scores to generate a prediction 330 (e.g., prediction 142) of a category to which to assign the call. For example, the prediction 330, in some instances as illustrated in FIG. 3, involves one of a "fraud" category 330A, a "genuine" category 330B, and an "undetermined/borderline" category 330C. For example, the CCS 320 determines that the call is in the fraud category 330A (e.g., the call is fraudulent) if the combined score is greater than a threshold combined score range, the call is in the genuine category (e.g., the call is not fraudulent) if the combined score is less than the threshold combined score range, and the call is an undetermined/borderline case if the combined score is within the threshold combined score range. In some instances, the CCCS 320 determines that the call is fraudulent (category 330A) if one or both of the prosodic score 320 or the phonetic score 315 is greater than or equal to a corresponding prosodic score 320 threshold range or phonetic score 315 threshold range, that the call is not fraudulent (category 330B) if one or both of the prosodic score 320 or the phonetic score 315 is less than the corresponding prosodic score 320 threshold range or phonetic score 315 threshold range, and that the call is a borderline/undetermined case (category 330C) if one or both of the prosodic score 320 or the phonetic score 315 is within the corresponding prosodic score 320 threshold range or phonetic score 315 threshold range, respectively.

At block 335, if the prediction 330 comprises the category "undetermined/borderline" (category 330C), the method 300 returns to block 305. For example, the CCCS 130 continues to receive subsequent audio data from the inbound call 301 and apply the fraud detection model 305 to the subsequent audio data added to the existing audio data. For example, the CCCS 130 receives a subsequent audio sample from the inbound call 301 (and/or from subsequent social media data 302), adds the subsequent audio sample to the previously-sampled audio from the inbound call 301, and performs steps 305 and 325 again to determine an updated prediction 330. In some instances, the updated prediction 330 remains unchanged from the previous prediction 330 and the inbound call 301 is determined to be undetermined/borderline 330C. In some instances, the updated prediction 330 categorizes the inbound call 301 in one of the categories of fraud 330A or genuine 330B.

Returning to block 335, if the prediction 330 comprises the category "fraud" (category 330A) or the "genuine" (category 330B), the method proceeds to block 240 of FIG. 2. At block 240, the CCCS 130 performs, based on the category for the call determined in block 230, one or more actions with regard to the call. In some instances, the actions include disconnecting the call and the CCCS 130 disconnects the call if the call responsive to assigning the call to the category of "fraud." In some instances, the actions include routing the call to a specific agent to continue the call and the CCCS 130 routes the call responsive to assigning the call to the category of "fraud." For example, the CCCS 130 may route the call to an experienced agent who can participate in the call to investigate and confirm whether the call is fraudulent. In some instances, the actions include reporting information associated with the call to another system and the CCCS 130 report the call to the other system responsive to assigning the call to the category of "fraud." In some instances, the actions include allowing the call to continue and the CCCS 130 allows the call to continue responsive to assigning the call to the category of "genuine."

Figure 4:
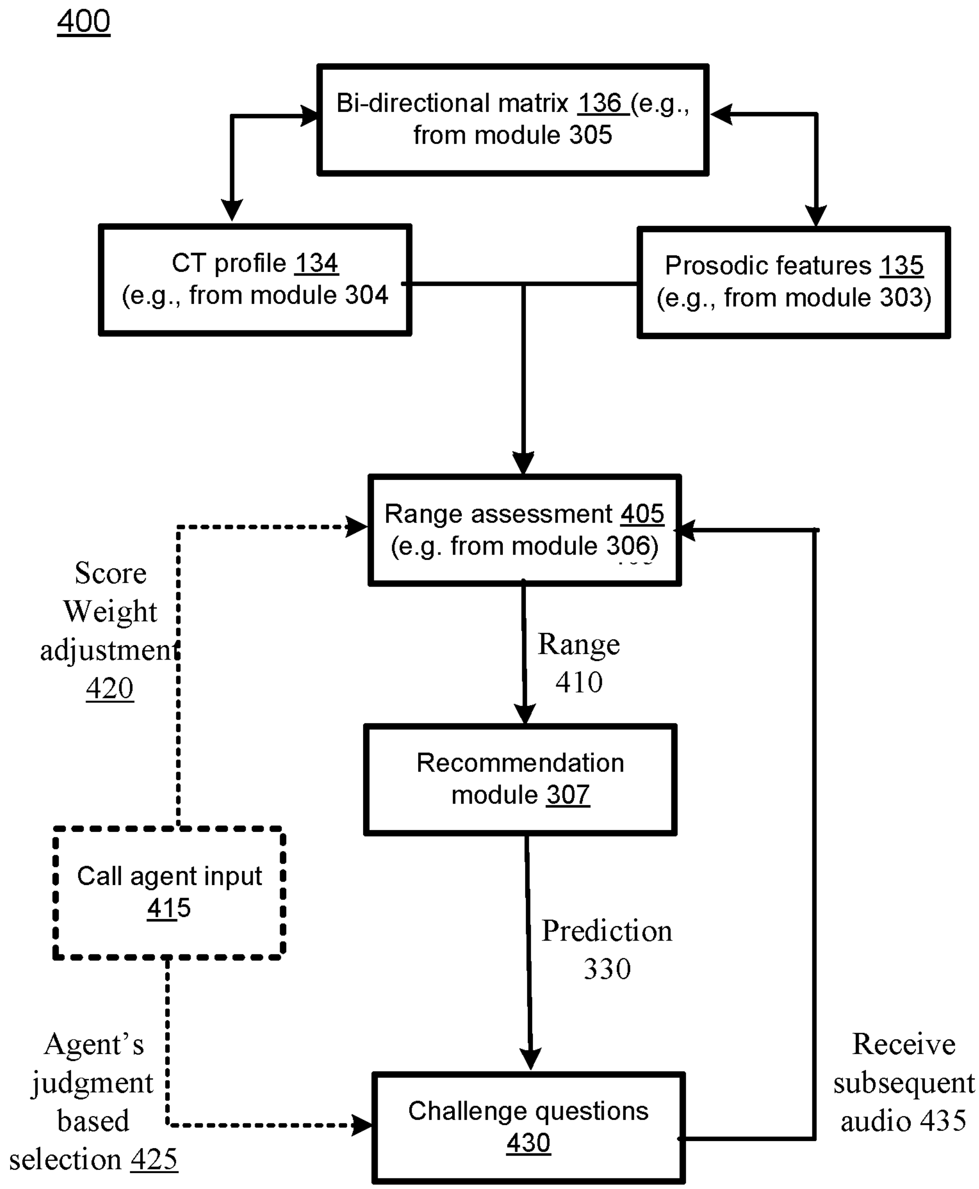
FIG. 4 depicts an example of a process for iteratively refining a scoring and a classification of an inbound call using a fraud detection model based on challenge questions and call agent input, according to certain embodiments disclosed herein.

FIG. 4 depicts an example of a process for iteratively refining a scoring and a classification of an inbound call using a fraud detection model based on challenge questions and call agent input, according to certain embodiments disclosed herein. One or more computing devices implement operations depicted in FIG. 4. For illustrative purposes, the process 400 is described with reference to certain examples depicted in the figures. Other implementations, however, are possible.

FIG. 4 provides further details concerning the flow of step 305 of FIG. 3 of applying the fraud detection model 310 to an inbound call 301. As depicted in FIG. 4, the bi-directional matrix module 304 generates a bi-directional matrix 136 comprising a matrix of the CT Profile 134 generated or otherwise accessed by the CT profile module 304 and the prosodic features 135 generated by the prosodic features module 303 to capture the influence of cultural tone on the prosodic features 135 or on other characteristics of the caller's voice. As depicted in FIG. 4, the range assessment module 306 assesses the prosodic features 135 based on the CT profile 134 and assigns a score range 410 and compares the score range 410 to business rules. As the prosodic features 135 can vary based on different factors like language, location, mother tongue, slang, weather at caller's location, the business rules define an acceptable range 410 instead of a fixed score given by a classification model. If the range 410, complies with the business rules, the recommendation module 307, which comprises a large language model ("LLM") based recommendation system, aids in arriving at a confirmatory state of the output (prediction 330) of the fraud detection model 138 for initial borderline cases. In certain embodiments, the recommendation module 307 generates one or more challenge questions 430 for the user making the inbound call 301 and retrieves, at step 435, subsequent audio data from the inbound call 301 comprising the user's vocal response to the one or more challenge questions. In certain embodiments, the recommendation module 307 continues to generate subsequent challenge questions and receive, at step 435, subsequent audio data from the inbound call 301 until the range assessment module 306 determines a score range 410 that complies with the business rules. For example, the recommendation module 307 may continue to generate challenge questions and access subsequent audio data from the inbound call 301 until it reaches the maximum number of iterations preset by the business rules or the score range 410 is above a threshold distance from a borderline score range. In some instances, the recommendation module 307 generates challenge questions to increase the available audio data that includes particular vowel phonemes to aid the call classification module 308 to reach a conclusion faster. In certain embodiments, as indicated in FIG. 4, call agent input 415 is also used for score weight adjustment 420. For example, a live call agent listening to the inbound call 301 can adjust the prosodic-specific and phonetic-specific weights used in calculating the combined score for prediction 330. In another example, the live call agent can adjust the business rules criteria that defines how the recommendation module 307 determines that the range 410 is acceptable. In certain embodiments, as indicated in FIG. 4, the call agent input 415 is used to initiate a judgment based selection (step 425) of challenge questions 430 designed by the live agent (or selected from a predefined list of questions by the live agent) to obtain subsequent audio data with particular vowel phonemes. This judgment based selection 425 of challenge questions is at the discretion of the live call agent.

Figure 5:
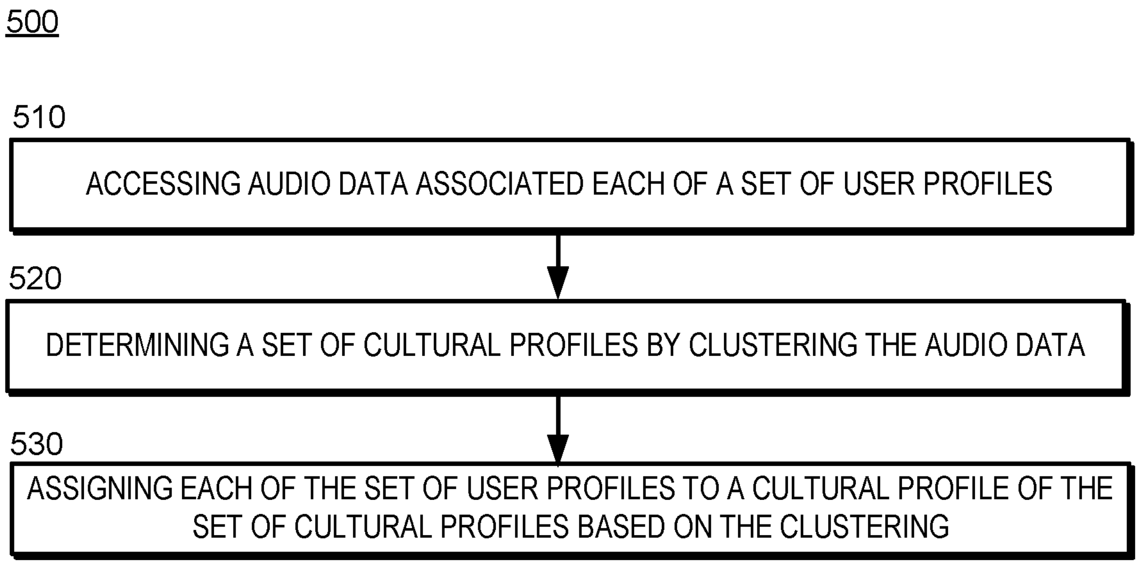
FIG. 5 depicts an example of a process for determining a set of cultural tone profiles for a set of user profiles and assigning each of a set of user profiles to a cultural tone profile, according to certain embodiments disclosed herein.

FIG. 5 depicts an example of a process for determining a set of cultural tone profiles for a set of user profiles and assigning each of a set of user profiles to a cultural tone profile, according to certain embodiments disclosed herein. One or more computing devices (e.g., CCCS 130 or the individual subsystems contained therein) implement operations depicted in FIG. 5. For illustrative purposes, the process 500 is described with reference to certain examples depicted in the figures. Other implementations, however, are possible.

At block 510, the process 500 involves accessing, by the CCCS 130, audio data associated with each of a set of user profiles. In an example, the CCCS 130 stores the audio data in the user data 132-1, 132-2, . . . 132-*n* associated with each of a set of n users 101 (users 101-1, 101-2, . . . 101-*n*) and accesses the stored data from the user data 132. In an example, the audio data comprises prerecorded (e.g. prior to any received inbound calls 301 from the set of users) voice data and/or an on-boarding voice profiling.

At block 520, the process 500 involves determining, by the CCCS 130, a set of cultural profiles by clustering the audio data accessed at block 510. For example, the CCCS 130 generates clusters of cultural tones. For example, the CCCS 130 generates a set of k CT clusters, where $CT1 \cup CT2 \ldots \cup CTk = \{1, \ldots, n\}$. The CCCS 130 determines a respective cultural tone profile 134 for each of the set of k CT clusters.

At block 530, the process 550 involves assigning, by the CCCS 130, each of the set of user profiles to a cultural tone profile 134 of the set of cultural tone profiles 134. In some embodiments, no user profile of the set of user profiles may belong to more than one CT profile 134 cluster, where $CTi \cap CTj = \emptyset$ for all $i \neq j$. In the CT profile 134, factors including cultural background, mother tongue, surrounding weather conditions, and/or use of slang have a strong influence on the expected prosodic features 140 that would be identified for the user as the user is speaking during a voice call.

FIG. 6 depicts examples of cultural tone profiles, according to certain embodiments disclosed herein. For illustrative purposes, FIG. 6 is described with reference to certain examples depicted in the figures. Other implementations, however, are possible. FIG. 6 depicts a matrix 610, which is generated based on a set of cultural tone profiles 134 associates each of the set of cultural tone profiles 134 (indicated as "CT→" in the figure) with a specific profile 620 (1), 630 (2), or 640 (3) defining value ranges for each of the features of timbre, loudness, and pitch. As illustrated in the matrix 610 of FIG. 6, each of the set of cultural tone profiles 134 has unique timbre, loudness, and pitch features defined in the respective cultural tone profile 134. As depicted in FIG. 6, in the matrix 640, each customer is associated with a profile—620 (1), 630 (2), or 640 (3) for each cultural tone in the matrix 640. As depicted in FIG. 6, a profile—620 (1), 630 (2), or 640 (3) is selected for each of timbre, loudness, and pitched and ranked, from top to bottom, in an order of importance starting from the top row going downward. FIG. 6 depicts three example profiles 620 (1), 630 (2), and 640 (3). Each of the three example profiles 620, 630, and 640 indicate, for each of three features—T—tone, P—pitch, and L—loudness—a set of values for each of a set of user profiles of a cultural tone profile 134. For example, each column represents a separate user profile of a cultural tone profile cluster and defines values for each of the three features for the user profile. For example, profile 620 defines tone values of 60%, 70%, 80%, and 90% for user profiles 1, 2, 3, 4, respectively, a pitch value range of between 30% and 10% for user profile 1, and a loudness value range of between 30% and 10% for user profile 1. For example, profile 630 defines a tone value range of between 30% and 10% for user profile 1, a pitch value range of between 30% and 10% for user profile 1, and loudness values of 60%, 70%, 80%, and 90% for user profiles 1, 2, 3, and 4, respectively. For example, profile 640 defines a tone value range of between 30% and 10% for user profile 1, pitch values of 60%, 70%, 80%, and 90% for user profiles 1, 2, 3, and 4, respectively, and a loudness value range of between 30% and 10% for user profile 1. The bi-directional matrix 640 looks at each cultural tone profile from the clustering profile and provides the dominant feature from tone (T), pitch (P), and loudness (L). For example, cultural tone profile 610 provides a caller with high T starting from 60% to 90% while P and L would be in the range between 10% and 30%. Accordingly, each cell of bi-directional matrix in 640 comprises a child matrix similar to one of cultural tone profiles 610/620/630 based on the dominant feature and each caller in that cultural tone profile of a particular column will be mapped to the child matrix similar to cultural tone profiles 610/620/630 to create the finer profiling of the caller. In certain examples, when the matrix 640 is first created, the callers (e.g. associated with user profiles) are classified based on the tone dominance (e.g. cultural tone profile 610 is dominant on timber, 620 is dominant on loudness and 630 is dominant on pitch) this matrix (including the child matrix) would provide the bi directional matrix. Knowing the characteristics of the cultural tone profiles 610 620, or 630, the appropriate culture tone CT (1, 2, . . . , or n) can be selected, and vice versa.

Examples of Computing Environments for Implementing Certain Embodiments

Figure 7:
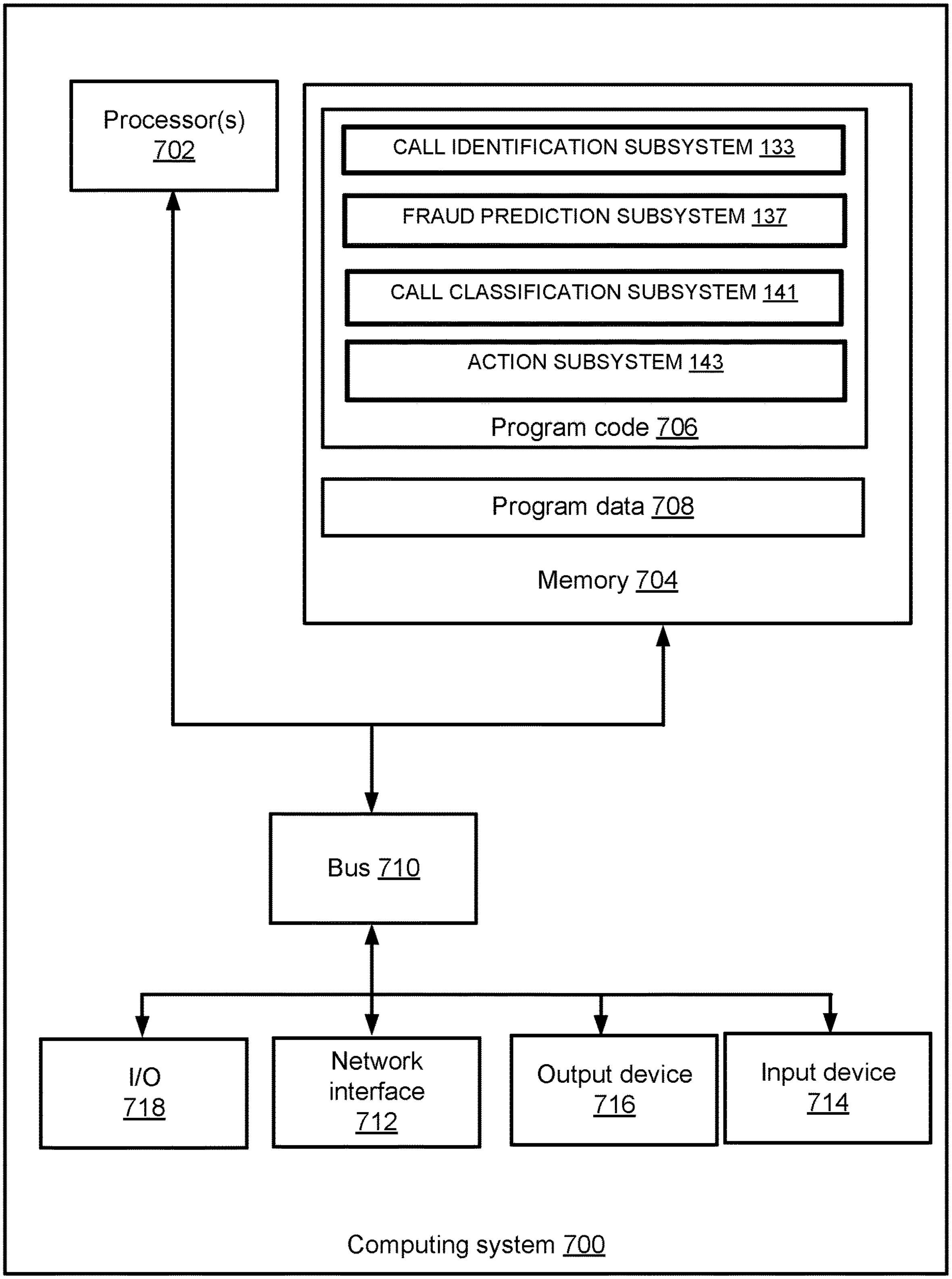
FIG. 7 depicts an example of a computing system that performs certain operations described herein, according to certain embodiments disclosed herein.

Any suitable computer system or group of computer systems can be used for performing the operations described herein. For example, FIG. 7 depicts an example of a computer system 700. The depicted example of the computer system 700 includes a processor 702 communicatively coupled to one or more memory devices 704. The processor 702 executes computer-executable program code stored in a memory device 704, accesses information stored in the memory device 404, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

The memory device 704 includes any suitable non-transitory computer-readable medium for storing program code 706, program data 708, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory device 1104 can be volatile memory, non-volatile memory, or a combination thereof.

The computer system 700 executes program code 706 that configures the processor 702 to perform one or more of the operations described herein. Examples of the program code 706 include, in various embodiments, the subsystems 133, 137, 141, and 143 of FIG. 1, which may include any other suitable systems or subsystems that perform one or more operations described herein (e.g., one or more neural networks, encoders, attention propagation subsystem and segmentation subsystem). The program code 706 may be resident in the memory device 704 or any suitable computer-readable medium and may be executed by the processor 702 or any other suitable processor.

The processor 702 is an integrated circuit device that can execute the program code 706. The program code 706 can be for executing an operating system, an application system or subsystem, or both. When executed by the processor 702, the instructions cause the processor 402 to perform operations of the program code 706. When being executed by the processor 702, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory devices 704 store the program data 708 that includes one or more datasets described herein. In some embodiments, one or more of data sets are stored in the same memory device (e.g., one of the memory devices 704). In additional or alternative embodiments, one or more of the programs, data sets, models, and functions described herein are stored in different memory devices 704 accessible via a data network. One or more buses 710 are also included in the computer system 700. The buses 710 communicatively couple one or more components of a respective one of the computer system 700.

In some embodiments, the computer system 700 also includes a network interface device 712. The network interface device 712 includes any device or group of devices suitable for establishing a wired or wireless data connection to one or more data networks. Non-limiting examples of the network interface device 712 include an Ethernet network adapter, a modem, and/or the like. The computer system 700 is able to communicate with one or more other computing devices via a data network using the network interface device 712.

The computer system 700 may also include a number of external or internal devices, an input device 714, a presentation device 716, or other input or output devices. For example, the computer system 700 is shown with one or more input/output ("I/O") interfaces 718. An I/O interface 718 can receive input from input devices or provide output to output devices. An input device 714 can include any device or group of devices suitable for receiving visual, auditory, or other suitable input that controls or affects the operations of the processor 702. Non-limiting examples of the input device 714 include a touchscreen, a mouse, a keyboard, a microphone, a separate mobile computing device, etc. A presentation device 716 can include any device or group of devices suitable for providing visual, auditory, or other suitable sensory output. Non-limiting examples of the presentation device 716 include a touchscreen, a monitor, a speaker, a separate mobile computing device, etc.

Although FIG. 7 depicts the input device 714 and the presentation device 716 as being local to the computer system 700, other implementations are possible. For instance, in some embodiments, one or more of the input device 714 and the presentation device 716 can include a remote client-computing device that communicates with computing system 700 via the network interface device 712 using one or more data networks described herein.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A computer-implemented method in which a computing system performs operations comprising:

identifying a user profile associated with information identifying a user in a call received at a call center;

accessing, by the computing system, audio data comprising an audio segment of the call received at the call center;

applying a fraud detection model to the audio data to determine one or more scores predicting a likelihood that the call is fraudulent, wherein applying the fraud detection model to the audio data comprises:

accessing a cultural tone profile associated with the user profile, wherein the cultural tone profile defines a first combination of features determined from a baseline voice sample associated with the user profile, wherein the cultural tone profile is one of a plurality of cultural tone profiles generated by;

accessing, for each of a set of user profiles including the user profile, a respective voice sample, wherein the voice sample accessed for the user profile comprises the baseline voice sample;

clustering, based on a set of features extracted from the accessed voice samples, the accessed voice samples into a set of clusters; and based on the clustering:

generating the plurality of cultural tone profiles by defining, for each of the set of clusters, a cultural tone profile having a specific combination of values associated with the set of features; and assigning each user profile to a respective cultural tone profile of the plurality of cultural tone profiles;

generating prosodic features defining a second combination of features associated with a voice recorded in the audio segment of the call; and determining the one or more scores by evaluating the generated prosodic features based on the cultural tone profile;

based on the one or more scores, categorizing the call in a particular category selected from a predefined set of categories; and based on the selected category for the call, performing an action with regard to the call.

2. The computer-implemented method of claim 1, the operations further comprising:

accessing, from one or more social media computing systems, social media audio data comprising one or more portions of audio spoken by the user associated with the user profile; and adding the social media audio data to the audio data, wherein the audio data comprises the audio data from the call.

3. The computer-implemented method of claim 1, wherein the identifying information comprises a telephone number or other device identifier of a user computing device from which the call is initiated.

4. The computer-implemented method of claim 1, wherein the set of features comprise timbre, loudness, and pitch.

5. The computer-implemented method of claim 1, the operations further comprising:

transmitting, on the call, one or more questions seeking subsequent audio input; and receiving, responsive to transmitting the one or more questions, the subsequent audio input, wherein determining the one or more scores comprises determining a prosodic score predicting a degree of truthfulness of the subsequent audio input in view of the transmitted one or more questions.

6. The computer-implemented method of claim 1, wherein the one or more scores comprise a phonetic score predicting a degree of originality of the voice based on an influence of the cultural tone profile on the generated prosodic features.

7. The computer-implemented method of claim 1, wherein the one or more scores comprise a prosodic score and a phonetic score and wherein generating the one or more scores comprises generating a combined score comprising a weighted average or weighted sum of the prosodic score and the phonetic score.

8. The computer-implemented method of claim 1, wherein the set of categories comprise a fraudulent category, a nonfraudulent category, and a borderline category.

9. The computer-implemented method of claim 8, wherein the particular category selected from the predefined set of categories comprises the fraudulent category and wherein the action comprises one or more of disconnecting the call at the call center, routing the call to a destination at the call center other than a destination at which the call was received, or reporting information describing the call to another system.

10. The computer-implemented method of claim 8, wherein the particular category selected from the predefined set of categories comprises the borderline category and wherein the action comprises:

accessing, from the call, subsequent audio data comprising a subsequent audio segment of the call occurring at a time after accessing the audio segment;

incorporating the subsequent audio segment into the audio data to generate updated audio data;

applying the fraud detection model to the updated audio data to generate one or more updated scores corresponding to the one or more scores; and based on the one or more updated scores, categorizing the call in a second particular category selected from a predefined set of categories, wherein the second particular category is different from the particular category.

11. A non-transitory computer-readable medium having program code that is stored thereon, the program code executable by one or more processing devices for performing operations comprising:

identifying a user profile associated with information identifying a user in a call received at a call center;

accessing, by the one or more processing devices, audio data comprising an audio segment of the call received at the call center;

applying a fraud detection model to the audio data to determine one or more scores predicting a likelihood that the call is fraudulent, wherein applying the fraud detection model to the audio data comprises:

accessing a cultural tone profile associated with the user profile, wherein the cultural tone profile defines a first combination of features determined from a baseline voice sample associated with the user profile, wherein the cultural tone profile is one of a plurality of cultural tone profiles generated by;

accessing, for each of a set of user profiles including the user profile, a respective voice sample, wherein the voice sample accessed for the user profile comprises the baseline voice sample;

clustering, based on a set of features extracted from the accessed voice samples, the accessed voice samples into a set of clusters; and based on the clustering:

generating the plurality of cultural tone profiles by defining, for each of the set of clusters, a cultural tone profile having a specific combination of values associated with the set of features; and assigning each user profile to a respective cultural tone profile of the plurality of cultural tone profiles;

generating prosodic features defining a second combination of features associated with a voice recorded in the audio segment of the call; and determining the one or more scores by evaluating the generated prosodic features based on the cultural tone profile;

based on the one or more scores, categorizing the call in a particular category selected from a predefined set of categories; and based on the selected category for the call, performing an action with regard to the call.

12. The non-transitory computer-readable medium of claim 11, the operations further comprising:

accessing, from one or more social media computing systems, social media audio data comprising one or more portions of audio spoken by the user associated with the user profile; and adding the social media audio data to the audio data, wherein the audio data comprises the audio data from the call and the social media audio data.

13. The non-transitory computer-readable medium of claim 11, wherein the identifying information comprises a telephone number or other device identifier of a user computing device from which the call is initiated.

14. The non-transitory computer-readable medium of claim 11, wherein the set of features comprise timbre, loudness, and pitch.

15. The non-transitory computer-readable medium of claim 11, the operations further comprising:

transmitting, on the call, one or more questions seeking subsequent audio input; and receiving, responsive to transmitting the one or more questions, the subsequent audio input, wherein determining the one or more scores comprises determining a prosodic score predicting a degree of truthfulness of the subsequent audio input in view of the transmitted one or more questions.

16. The non-transitory computer-readable medium of claim 11, wherein the one or more scores comprise a phonetic score predicting a degree of originality of the voice based on an influence of the cultural tone profile on the generated prosodic features.

17. The non-transitory computer-readable medium of claim 11, wherein the one or more scores comprise a prosodic score and a phonetic score and wherein generating the one or more scores comprises generating a combined score further comprises generating a combined score comprising a weighted average or weighted sum of the prosodic score and the phonetic score.

18. A system, comprising:

a non-transitory computer readable medium comprising computer-executable program instructions that, when executed by a processor, cause the system to perform operations comprising:

identifying a user profile associated with information identifying a user in a call received at a call center;

accessing, by the system, audio data comprising an audio segment of the call received at the call center;

applying a fraud detection model to the audio data to determine one or more scores predicting a likelihood that the call is fraudulent, wherein applying the fraud detection model to the audio data comprises:

accessing a cultural tone profile associated with the user profile, wherein the cultural tone profile defines a first combination of features determined from a baseline voice sample associated with the user profile, wherein the cultural tone profile is one of a plurality of cultural tone profiles generated by;

accessing, for each of a set of user profiles including the user profile, a respective voice sample, wherein the voice sample accessed for the user profile comprises the baseline voice sample;

clustering, based on a set of features extracted from the accessed voice samples, the accessed voice samples into a set of clusters; and based on the clustering:

generating the plurality of cultural tone profiles by defining, for each of the set of clusters, a cultural tone profile having a specific combination of values associated with the set of features; and assigning each user profile to a respective cultural tone profile of the plurality of cultural tone profiles generating prosodic features defining a second combination of features associated with a voice recorded in the audio segment of the call; and determining the one or more scores by evaluating the generated prosodic features based on the cultural tone profile;

based on the one or more scores, categorizing the call in a particular category selected from a predefined set of categories; and based on the selected category for the call, performing an action with regard to the call.

* * * * *